United States Patent [19]
Iwakiri

[11] Patent Number: 5,969,652
[45] Date of Patent: Oct. 19, 1999

[54] IMAGE INFORMATION READ-OUT APPARATUS WITH CIRCUIT CORRECTING FOR THE INFLUENCE OF SHADING

[75] Inventor: Naoto Iwakiri, Kanagawa-ken, Japan

[73] Assignee: Fuji Photo Film Co., Ltd., Kanagawa-Ken, Japan

[21] Appl. No.: 08/953,232

[22] Filed: Oct. 17, 1997

[30] Foreign Application Priority Data

Oct. 17, 1996 [JP] Japan ................................. 8-274655

[51] Int. Cl.$^6$ .......................... H03M 1/06; G06K 9/40
[52] U.S. Cl. .......................................... 341/118; 382/274
[58] Field of Search .................................. 341/118, 120; 358/461, 453, 448; 382/274

[56] References Cited

U.S. PATENT DOCUMENTS

| | | | |
|---|---|---|---|
| 5,052,879 | 10/1991 | Kubota | 358/244 |
| 5,361,140 | 11/1994 | Hayenga et al. | 358/446 |
| 5,696,852 | 12/1997 | Minoura et al. | 382/266 |
| 5,737,101 | 4/1998 | Ito | 358/525 |

Primary Examiner—Howard L. Williams
Assistant Examiner—Peguy JeanPierre
Attorney, Agent, or Firm—Sughrue, Mion, Zinn Macpeak & Seas, PLLC

[57] ABSTRACT

In an image information read-out apparatus, a light beam scans an image recorded on a recording medium and an analog image signal representing the image is obtained. A logarithmic amplifier for logarithmic transformation of the analog image signal has certain characteristics in that a nonlinear portion of its range is in a dynamic range of the analog image signal. An A/D convertor digitizes the analog image signal transformed by the logarithmic amplifier and obtains a digital image signal. A correction circuit corrects the digital image signal so that the influence of shading is cancelled and linearly interpolates the part of the digital image signal corresponding to the nonlinear portion of the characteristics of the logarithmic amplifier on the basis of the characteristics of the shading and the characteristics of the nonlinear portion of the characteristics of the logarithmic amplifier, which have been obtained in advance.

8 Claims, 4 Drawing Sheets

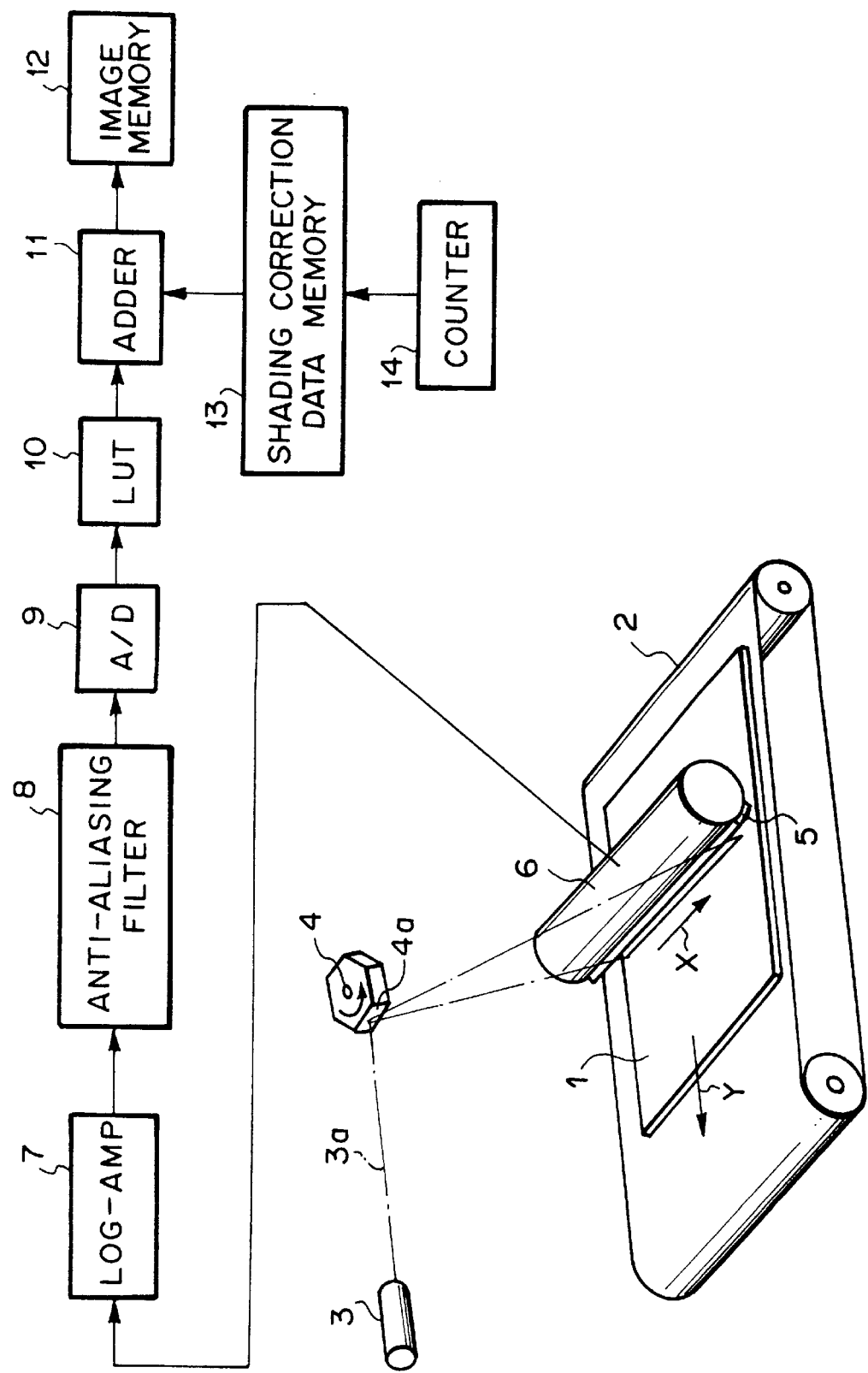
F I G. 1

IMAGE INFORMATION READ-OUT APPARATUS WITH CIRCUIT CORRECTING FOR THE INFLUENCE OF SHADING

BACKGROUND OF THE INVENTION

1. Field of the Invention

This invention relates to an image information read-out apparatus, and more particularly to a shading correction which is carried out by an image information read-out apparatus on an image read out by the apparatus.

2. Description of the Related Art

There have been various known image information read-out apparatuses in which a light beam is caused to scan a recording medium on which an image is recorded and image information representing the image is read out by detecting the reflected light, transmitted light or light emitted from the recording medium. For such image information read-out apparatuses, as well as for image scanners, facsimile machines or the like, a radiation image information read-out apparatus may be used in a radiation image recording and reproducing system using a stimulable phosphor sheet.

In such image information read-out apparatuses, fluctuation in the image signal in the main scanning direction (so-called shading) can occur due to nonuniformity in the projecting angle of the light beam and/or nonuniformity in the sensitivity of the photodetector. In order to overcome this problem, various propositions have been made. Though we have proposed a method in which the sensitivity of the photodetector is corrected to avoid influence of shading, shading is recently mainly compensated for by adding or subtracting correction data to or from a digitized image signal (digital shading correction). See, for instance, Japanese Unexamined Patent Publication No. 9(1997)-69940.

However when a shading correction is carried out in a digital region, the following problem arises. That is, for example, when the shading characteristics are as shown in FIG. 4, the effective dynamic range is narrower than the natural dynamic range by an amount corresponding to the shading (i.e., the difference between the maximum value and the minimum value of the shading data).

SUMMARY OF THE INVENTION

In view of the foregoing observations and description, the primary object of the present invention is to provide an image information read-out apparatus in which a digital shading correction can be effected without narrowing the dynamic range.

In accordance with a first aspect of the present invention, there is provided an image information read-out apparatus comprising an analog image signal read-out means which causes a light beam to scan an image recorded on a recording medium and obtains an analog image signal representing the image, a logarithmic amplifier for logarithmic transformation of the analog image signal which has certain characteristics in that a nonlinear portion of its range is in a dynamic range of the analog image signal, an A/D convertor which digitizes the analog image signal transformed by the logarithmic amplifier, thereby obtaining a digital image signal, and a correction means which corrects the digital image signal so that the influence of the shading is cancelled and carries out linear interpolation on the part of the digital image signal corresponding to the nonlinear portion of the characteristics of the logarithmic amplifier on the basis of the characteristics of shading and the characteristics of the nonlinear portion of the characteristics of the logarithmic amplifier, which have been obtained in advance.

Use of "a logarithmic amplifier which has certain characteristics in that a nonlinear portion of its range is in a dynamic range of the analog image signal" means to use on purpose a nonlinear characteristic portion of the logarithmic amplifier, where the characteristics of the logarithmic amplifier are nonlinear, in the logarithmic transformation of the analog image signal. Usually, only a linear characteristic portion of the logarithmic amplifier is generally used in a logarithmic transformation of an image signal.

The correction means carries out a processing for restoring linearlity of the part of the digital image signal converted by the nonlinear characteristic portion of the logarithmic amplifier in addition to the processing which has been carried out in the conventional digital shading correction.

The correction means may comprise a conversion table for carrying out a linear interpolation on the digital image signal on the basis of the characteristics of the nonlinear characteristic portion of the logarithmic amplifier, a shading correction data memory for storing shading correction data which are prepared to cancel the influence of shading on the basis of the characteristics of the shading which have been obtained in advance and an adder which adds the shading correction data to the digital image signal.

Otherwise the correction means may comprise a shading correction data memory for storing shading correction data which are prepared to correct the digital image signal so that the influence of the shading is cancelled and to linearly interpolate the part of the digital image signal corresponding to the nonlinear characteristic portion of the logarithmic amplifier on the basis of the characteristics of shading and the characteristics of the nonlinear characteristic portion of the logarithmic amplifier, which have been obtained in advance, and an adder which adds the shading correction data to the digital image signal.

That "the shading correction data are prepared to correct the digital image signal so that the influence of the shading is cancelled and to linearly interpolate the part of the digital image signal corresponding to the nonlinear characteristic portion of the logarithmic amplifier" means that the shading correction data are obtained by adjusting natural shading correction data which are obtained from the characteristics of shading so that addition of the adjusted data to the digital image signal results in the same effect as that obtained by linearly interpolating the digital image signal.

It is preferred that the nonlinear characteristic portion of the logarithmic amplifier corresponds to a high density portion and/or a low density portion of the dynamic range. Further it is preferred that the characteristics of the nonlinear characteristic portion of the logarithmic amplifier be of saturation characteristics.

In accordance with a second aspect of the present invention, there is provided an image information read-out apparatus comprising an analog image signal read-out means which causes a light beam to scan an image recorded on a recording medium and obtains an analog image signal representing the image, a first A/D convertor which has a dynamic range narrower than that of the analog image signal and digitizes the analog image signal, an offset means which gives to the analog image signal an offset of a predetermined width which is not smaller than the dynamic range difference between the dynamic range of the analog image signal and the dynamic range of the first A/D convertor and not larger than the dynamic range of the analog image signal, a second A/D convertor for digitizing the analog image signal given the offset by the offset means which has a dynamic range not narrower than the dynamic range difference, and an operator which adds the output of the second A/D convertor to the output of the first A/D convertor with the amount of the offset and the amount of the difference between the dynamic range of the first A/D convertor and the offset overlapping each other and subtracts the amount of the overlapping from the result of the addition.

In the image information read-out apparatus of the first aspect, the portion of the image signal which goes beyond a predetermined range (such a portion will be referred to as "over range portion", hereinbelow) upon digitization is held by use of the nonlinear characteristic portion of the logarithmic amplifier. To the contrast, in the image information read-out apparatus of the second aspect, an exclusive convertor is provided, an offset is given to the image signal and the over range portion is separately digitized by the exclusive convertor.

That is, the "first A/D convertor which has a dynamic range narrower than that of the analog image signal" is an A/D convertor which performs the same function as in the conventional system, that is, such an A/D convertor that digitization by the A/D convertor will result in a narrow dynamic range due to the over range portion. The "second A/D convertor which has a dynamic range not narrower than the dynamic range difference" is an A/D convertor for the over range portion which has a dynamic range sufficient to digitize the over range portion.

Accordingly, the "offset of a predetermined width which is not smaller than the dynamic range difference between the dynamic range of the analog image signal and the dynamic range of the first A/D convertor and not larger than the dynamic range of the analog image signal" is an offset necessary for digitizing the over range portion by the second A/D convertor.

Further, the "operator which adds the output of the second A/D convertor to the output of the first A/D convertor with the amount of offset and the amount of the difference between the dynamic range of the first A/D convertor and the offset overlapping each other and subtracts the amount of the overlapping from the result of the addition" is no other than an operator which adds the outputs of the first and second A/D convertors and carries out on the result of the addition a processing for obtaining a single digital image signal therefrom. Though the overlapping corresponds to an overlapping of the ranges digitized by the first and second A/D convertors, the ranges cannot overlap depending on the amount of the offset. Accordingly the "amount of the overlapping" may be 0.

Preferably the image information read-out apparatus of the second aspect is provided with a continuity correction means which corrects the outputs of the first and second A/D convertors so that they are caused to smoothly merge with each other by said addition.

Further since the second A/D convertor is for digitizing a large signal which is increased to exceed a predetermined range by giving the offset to an input image signal, the second A/D convertor may double as a detector for determining the level of erasing light when the image information read-out apparatus is for reading out a radiation image recorded on a stimulable phosphor sheet.

In the image information read-out apparatus in accordance with the first aspect of the present invention, since the nonlinear characteristic portion of the logarithmic amplifier for logarithmic transformation of the analog image signal is included in the dynamic range of the analog image signal, a portion of the analog image signal which can become an over range portion upon digitization due to shading is compressed by the nonlinear characteristics of the logarithmic amplifier, and the digital image signal obtained is corrected on the basis of the characteristics of shading and the characteristics of the nonlinear characteristic portion of the logarithmic amplifier, which have been obtained in advance, so that the influence of the shading is cancelled while the part of the digital image signal corresponding to the nonlinear characteristic portion of the logarithmic amplifier is linearly interpolated. Thus the shading correction can be effected without narrowing the dynamic range.

In the image information read-out apparatus in accordance with the second aspect of the present invention, the analog image signal is digitized as it is by an A/D convertor exclusive for an image signal while the same image signal is given an offset and is digitized a separate A/D convertor for an over range portion, then the outputs of the A/D convertors are added and a predetermined operation is carried out on the result of the addition. Accordingly, a portion of the image signal which will exceed a predetermined range due to shading if the image signal is digitized by the conventional system can be held, whereby the shading correction can be effected without narrowing the dynamic range.

BRIEF DESCRIPTION OF THE DRAWINGS

FIG. 1 is a schematic view showing an image information read-out apparatus in accordance with a first aspect of the present invention.

DESCRIPTION OF THE PREFERRED EMBODIMENTS

Figure 2:
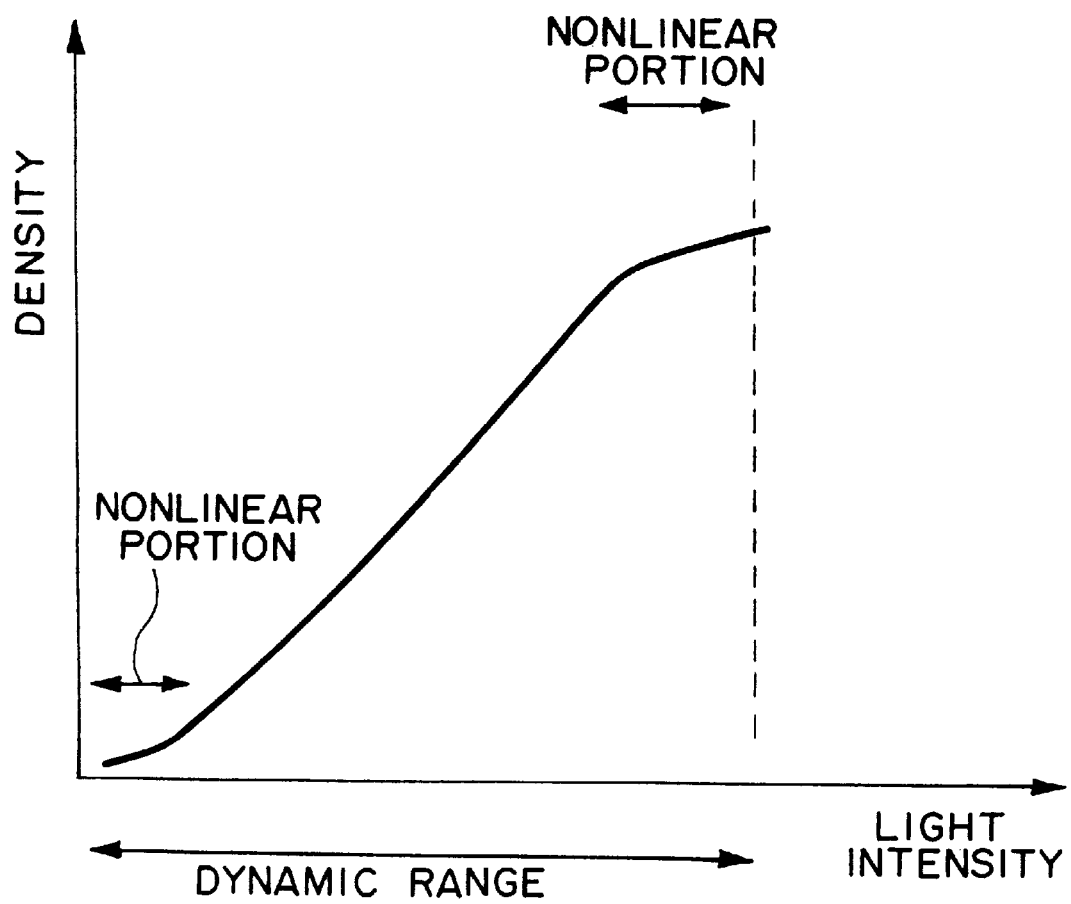
FIG. 2 is a view for illustrating the relation between the characteristics of a logarithmic amplifier and the dynamic range.

The image information read-out apparatus shown in FIG. 1 is a radiation image read-out apparatus which is used, in a radiation image recording and reproducing system disclosed, for instance, in U.S. Pat. No. 4,258,264 and Japanese Unexamined Patent Publication No. 56(1981)-11395, in order to read out light emitted from a stimulable phosphor sheet upon stimulation thereof. A stimulable phosphor sheet 1 on which radiation image information is stored is conveyed in the direction of arrow Y for sub-scanning by a sheet conveyor means 2. A stimulating light beam 3*a* emitted from a laser 3 is deflected by a reflecting surface 4*a* of a rotational polygonal mirror 4 to scan the stimulable phosphor sheet 1 in the direction of arrow X which is substantially perpendicular to the sub-scanning direction Y (main scanning). Each part of the stimulable phosphor sheet 1 exposed to the stimulating light beam 3*a* emits light in proportion to the radiation image information stored thereon. The light emitted from the stimulable phosphor sheet 1 impinges upon an elongated photomultiplier 6 disposed along the main scanning line through a light guide 5 and is photoelectrically detected by the photomultiplier 6.

An analog image signal output from the photomultiplier 6 is amplified by a logarithmic amplifier 7 and is caused to pass through an anti-aliasing filter 8 in order to prevent aliasing. Thereafter the analog image signal is digitized by an A/D convertor 8 and a predetermined conversion is carried out on the obtained digital image signal by a LUT (lookup table) 10. The digital image signal thus obtained is temporarily stored in an image memory 12 and then is subjected to an image processing as required before reproduced as a visible image on a CRT or a photosensitive medium or stored in a magnetic disk or the like.

In the image information read-out apparatus, shading is sometimes generated due to unevenness in the intensity of the stimulating light beam, scanning speed and/or sensitivity of the photomultiplier 6 in the main scanning direction. When shading is generated, the output signal of the photomultiplier 6 for given stored radiation energy varies depending on the scanning position of the beam, which results in incorrect read-out of the radiation image information. Accordingly it is necessary to correct the shading. Further when the light beam is deflected by a rotational polygonal mirror, the reflectivity, the angle to the rotational axis, the distance from the rotational axis and the rotational speed (deflecting speed) vary from reflecting surface to reflecting surface, and accordingly, the state of shading varies depending on the reflecting surface of the rotational polygonal mirror. In such a case, the shading correction may be effected according to the reflecting surfaces.

A shading correction memory 13, a counter 14 and an adder 11 are for carrying out the shading correction. That is, shading correction data which have been obtained in advance are stored in the shading correction memory 13, and the shading correction is performed by outputting the shading correction data to the adder 11 at timings designated by the counter 14 and adding the image signal converted by the LUT 10 and the shading correction data.

The shading correction data can be obtained, for instance, by exposing the entire area of the stimulable phosphor sheet 1 to radiations such as X-rays of uniform intensity (so-called solid exposure) and carrying out said read-out operation on the stimulable phosphor sheet thus obtained. That is, the difference between the maximum value and the minimum value of the output signal is caused by shading and the image signal thus obtained bears thereon the characteristics of the shading. Accordingly, shading correction data may be obtained picture element by picture element on a scanning line formed by each reflecting surface. Specific methods of calculating such shading correction data are disclosed in detail in Japanese Unexamined Patent Publication No. 9(1997)-69940, and accordingly will not be described here.

Figure 4:
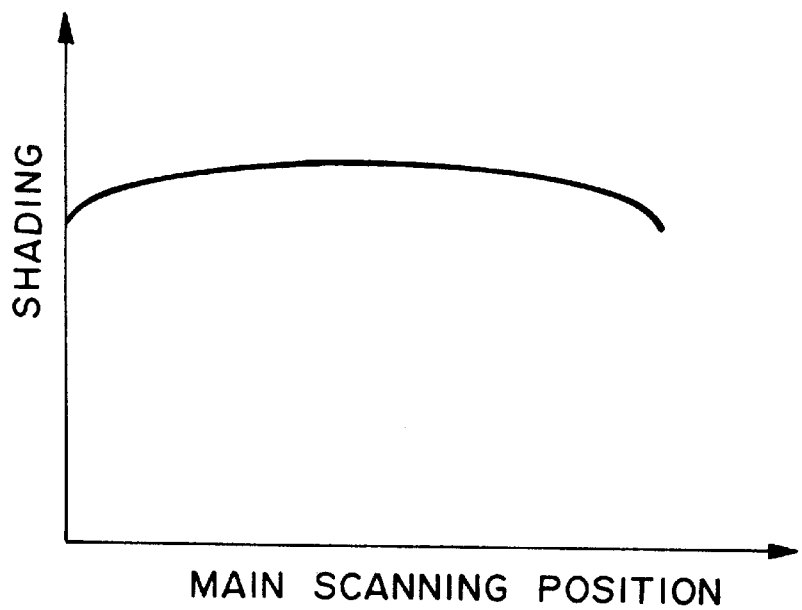
FIG. 4 is a view showing an example of characteristics of shading obtained beforehand.
Figure 5:
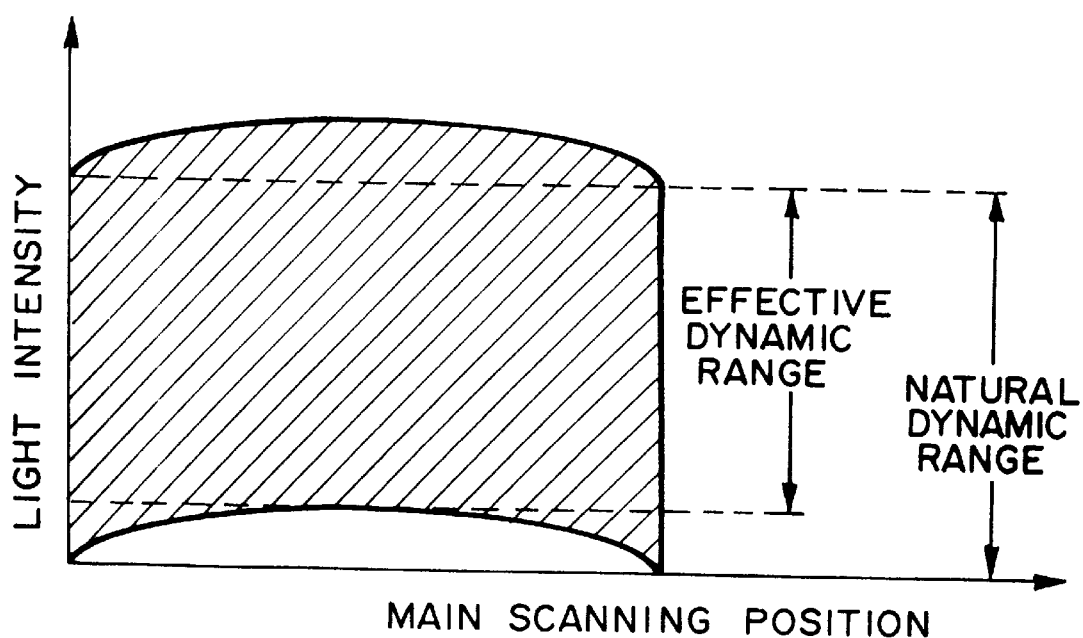
FIG. 5 is a view for illustrating a problem in a conventional shading correction.

For example, when the radiation image having the shading characteristics shown in FIG. 4 is read out in the manner described above, the effective dynamic range becomes narrower than the expected dynamic range due to the shading.

In the image information read-out apparatus of this embodiment, saturated characteristic portions of the logarithmic amplifier respectively corresponding to a high density portion and a low density portion are both in the dynamic range. That is, transformation by a logarithmic amplifier is generally effected by using a linear characteristic portion of the logarithmic amplifier. To the contrast, in the image information read-out apparatus of this embodiment, by use of the saturated characteristic portions (nonlinear characteristic portions) on purpose, the dynamic range is temporarily compressed and subsequently expanded, whereby the natural dynamic range can be maintained even if the dynamic range is narrowed due to shading.

The saturated characteristic portion of the logarithmic amplifier need not be full saturated so long as the dynamic range can be compressed. Further only one of the saturated portions may be used. In this case, it is preferred that the saturated characteristic portion corresponding to the high density portion be used in that transformation error in compressing and/or expanding the dynamic range becomes less noticeable.

The compressed dynamic range may be returned to the original state by defining the LUT 10 in FIG. 1 so as to make linear the nonlinear portion and thereafter adding thereto the shading correction data as in the conventional manner or simultaneously effecting the shading correction and the linearlity correction by setting the shading correction data so as to not only cancel shading itself but also make linear the nonlinear portion. In such a case, by measuring the characteristics of the logarithmic amplifier in advance, those skilled in the art can easily make the LUT 10 and the shading correction data on the basis of the measured characteristics of the logarithmic amplifier.

Figure 3:
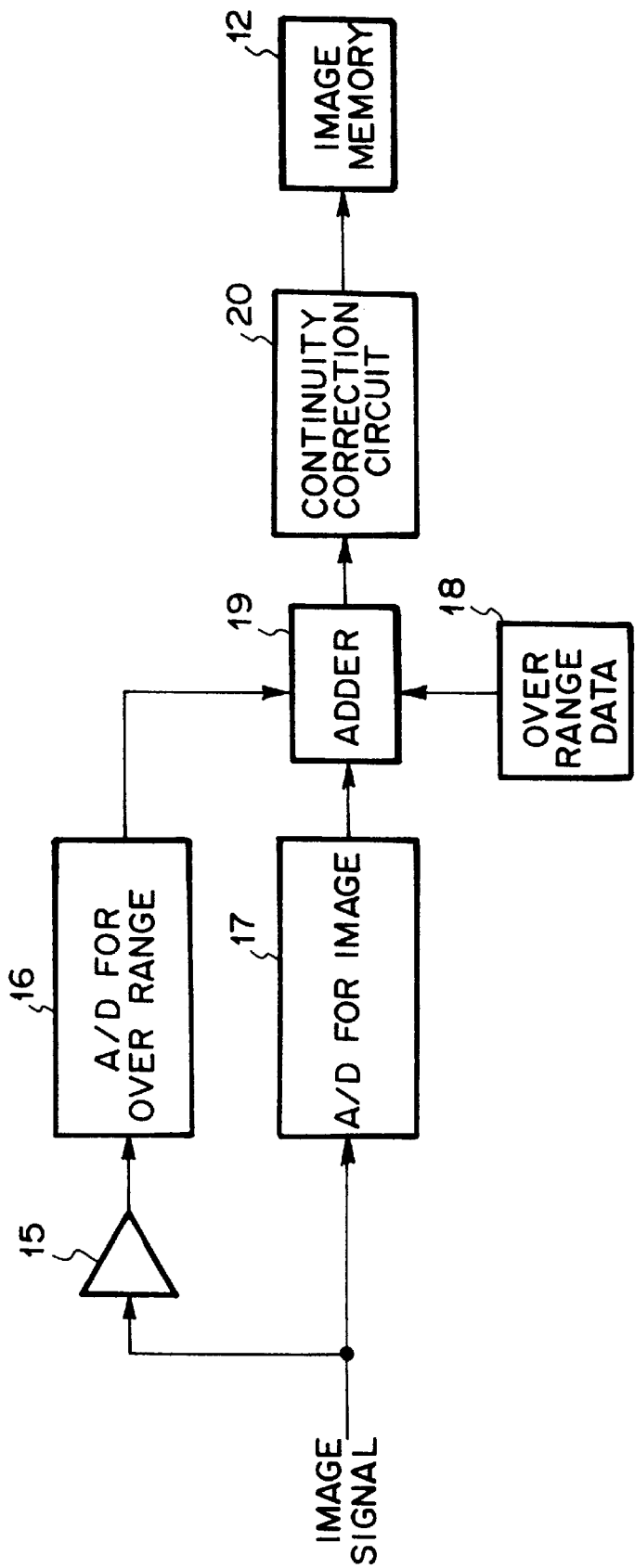
FIG. 3 is a block diagram for illustrating an important part of an image information read-out apparatus in accordance with a second embodiment of the present invention.

An image information read-out apparatus in accordance with a second embodiment of the present invention will be described with reference to FIG. 3, hereinbelow. In FIG. 3, the only the part downstream of the anti-aliasing filter is shown. The part not shown in FIG. 3 is the same as that shown in FIG. 1.

In the image information read-out apparatus of the first embodiment, the portion of the image signal which goes beyond a predetermined range (over range portion) upon digitization is held by use of the nonlinear characteristic portion of the logarithmic amplifier. To the contrast, in the image information read-out apparatus of the second embodiment, an exclusive convertor is provided, an offset is given to the image signal and the over range portion is separately digitized by the exclusive convertor.

Though the analog image signal is digitized by an A/D convertor 17 exclusive for the image signal, the portion of the image signal which exceeds the dynamic range upon digitization cannot be processed by the A/D convertor 17. The over range portion is processed by an A/D convertor 16 for the over range portion. In order to process the over range portion by the A/D convertor 16, a predetermined offset is given to the analog image signal by the offset gain adjuster 15.

The width of the offset should be not larger than the dynamic range of the analog image signal and at the same time should be not smaller than the difference between the dynamic range of the analog image signal and the dynamic range of the A/D convertor 17 exclusive for the image signal, i.e, the amount of the over range portion. Since it is preferred that the range processed by the A/D convertor exclusive for the image signal and the range processed by the A/D convertor for the over range portion overlap each other in view of the continuity of the data, actually it is preferred that the dynamic range of the A/D convertor for the over range portion be larger than the dynamic range of the aforementioned difference.

The outputs of the A/D convertor 17 exclusive for the image signal and the A/D convertor 16 for the over range portion are added by an adder 19. Since the result of the addition includes a part where the outputs of the A/D convertor 16 and 17 overlap each other, a purposive digital image signal can be obtained by subtracting the amount of overlapping from the result of the addition. By the operation described above, the digital image signal can be made smooth with the portion of the analog image signal which cannot be converted by the A/D convertor 17 exclusive for the image signal included in the digital image signal.

In the operation above, since the separately converted digital image signals are added, the resulting digital image signal sometimes cannot be smooth at the boundary between the digital image signals. In such a case, it is preferred that a continuity correction circuit 20 is provided to effect fine adjustment so that a smooth image signal can be obtained.

In the radiation image recording and reproducing system of the type described above, the stimulable phosphor sheet is generally exposed to erasing light after read-out of the image stored thereon in order to clear the radiation energy remaining on the stimulable phosphor sheet. The level of the erasing light should be sufficient to release the remaining radiation energy and accordingly the maximum value of the information on the stimulable phosphor sheet must be known, irrespective of the information range to be read out, in order to determine the level of the erasing light. The A/D convertor for the over range is for processing the range higher than the range which can be processed by the A/D convertor for the ordinary image signal and accordingly can be used also as a means for detecting the maximum value of the information on the stimulable phosphor sheet.

The present invention can be applied to other image information read-out apparatuses such as an image scanner. Further the arrangement of the present invention can also be applied to obtain desired linear characteristics, for instance, in the case where a logarithmic amplifier having desired linear characteristics is not available and a logarithmic amplifier whose nonlinear characteristic portion is included in the dynamic range must be unavoidably used.

What is claimed is:

1. An image information read-out apparatus comprising
    an analog image signal read-out means which causes a light beam to scan an image recorded on a recording medium and obtains an analog image signal representing the image,
    a logarithmic amplifier for logarithmic transformation of the analog image signal which has characteristics including a nonlinear portion of which is in a dynamic range of the analog image signal,
    an A/D convertor which digitizes the analog image signal transformed by the logarithmic amplifier, thereby obtaining a digital image signal, and
    a correction means which corrects the digital image signal so that the influence of shading is cancelled and carries out linear interpolation on the part of the digital image signal corresponding to the nonlinear portion of the characteristics of the logarithmic amplifier on the basis of the characteristics of shading and the characteristics of the nonlinear portion of the characteristics of the logarithmic amplifier, which have been obtained in advance.

2. An image information read-out apparatus as defined in claim 1 in which said correction means comprises a conversion table for carrying out a linear interpolation on the digital image signal on the basis of the characteristics of the nonlinear portion of the characteristics of the logarithmic amplifier,
    a shading correction data memory for storing shading correction data which are prepared to cancel the influence of shading on the basis of the characteristics of the shading which have been obtained in advance and
    an adder which adds the shading correction data to the digital image signal.

3. An image information read-out apparatus as defined in claim 1 in which said correction means comprises a shading correction data memory for storing shading correction data which are prepared to correct the digital image signal so that the influence of the shading is cancelled and to linearly interpolate the part of the digital image signal corresponding to the characteristics of the nonlinear portion of the characteristics of the logarithmic amplifier on the basis of the characteristics of shading and the characteristics of the nonlinear characteristic portion of the logarithmic amplifier, which have been obtained in advance, and
    an adder which adds the shading correction data to the digital image signal.

4. An image information read-out apparatus as defined in claim 1 in which said nonlinear portion of the characteristics of the logarithmic amplifier corresponds to a high density portion or a low density portion of the dynamic range.

5. An image information read-out apparatus as defined in claim 1 in which the characteristics of the nonlinear portion of the characteristics of the logarithmic amplifier is of saturation characteristics.

6. An image information read-out apparatus comprising
    an analog image signal read-out means which causes a light beam to scan an image recorded on a recording medium and obtains an analog image signal representing the image,
    a first A/D convertor which has a dynamic range narrower than that of the analog image signal and digitizes the analog image signal,
    an offset means which gives to the analog image signal an offset of a predetermined width which is not smaller than the dynamic range difference between the dynamic range of the analog image signal and the dynamic range of the first A/D convertor and not larger than the dynamic range of the analog image signal,
    a second A/D convertor which has a dynamic range not narrower than the dynamic range difference and digitizes the analog image signal given the offset by the offset means, and
    an operator which adds the output of the second A/D convertor to the output of the first A/D convertor with the amount of the offset and the amount of the difference between the dynamic range of the first A/D convertor and the offset overlapping each other and subtracts the amount of the overlapping from the result of the addition.

7. An image information read-out apparatus as defined in claim 6 further comprising a continuity correction means which corrects the outputs of the first and second A/D convertors so that they are caused to smoothly merge with each other by said addition.

8. An image information read-out apparatus as defined in claim 6 in which said image is a radiation image recorded on a stimulable phosphor sheet and said image information read-out apparatus detects the level of erasing light, to be projected onto the stimulable phosphor sheet in order to clear the radiation energy stored on the stimulable phosphor sheet, on the basis of the level of the signal input into the second A/D convertor.

* * * * *